(12) United States Patent
Liu et al.

(10) Patent No.: US 9,886,446 B1
(45) Date of Patent: Feb. 6, 2018

(54) INVERTED INDEX FOR TEXT SEARCHING WITHIN DEDUPLICATION BACKUP SYSTEM

(75) Inventors: Danzhou Liu, Blaine, MN (US);
Xianbo Zhang, Madison, WI (US);
Weibao Wu, Vadnais Heights, MN (US)

(73) Assignee: Veritas Technologies LLC, Mountain View, CA (US)

( * ) Notice: Subject to any disclaimer, the term of this patent is extended or adjusted under 35 U.S.C. 154(b) by 371 days.

(21) Appl. No.: 13/048,388

(22) Filed: Mar. 15, 2011

(51) Int. Cl.
G06F 17/30 (2006.01)
G06F 3/06 (2006.01)

(52) U.S. Cl.
CPC ...... G06F 17/30156 (2013.01); G06F 3/0641 (2013.01)

(58) Field of Classification Search
USPC .................................................. 707/664, 692
See application file for complete search history.

(56) References Cited

U.S. PATENT DOCUMENTS

| | | | | |
|---|---|---|---|---|
| 7,062,707 B1* | 6/2006 | Knauft et al. | ................. | 715/201 |
| 7,571,383 B2* | 8/2009 | Nomiyama et al. | ........... | 715/260 |
| 7,797,332 B1* | 9/2010 | Bove et al. | .................... | 707/769 |
| 7,836,053 B2* | 11/2010 | Naef, III | ....................... | 707/737 |
| 7,984,026 B2* | 7/2011 | Itsuka | ........................... | 707/692 |
| 8,190,835 B1* | 5/2012 | Yueh | ............................. | 711/162 |
| 8,214,359 B1* | 7/2012 | Gomes et al. | ................. | 707/728 |
| 8,214,376 B1 | 7/2012 | Jordan | | |
| 8,224,875 B1* | 7/2012 | Christiaens et al. | ........... | 707/813 |
| 8,392,384 B1* | 3/2013 | Wu et al. | ....................... | 707/693 |
| 8,554,764 B2* | 10/2013 | Mosoi et al. | .................. | 707/722 |
| 2003/0004941 A1* | 1/2003 | Yamada | ............ | G06F 17/30625 |
| 2006/0015486 A1* | 1/2006 | Nomiyama | ....... | G06F 17/30634 |
| 2006/0282760 A1* | 12/2006 | Tanaka | .......................... | 715/509 |
| 2008/0263023 A1* | 10/2008 | Vailaya | ............. | G06F 17/30675 |
| 2010/0077013 A1* | 3/2010 | Clements et al. | ............. | 707/822 |
| 2010/0094840 A1* | 4/2010 | Donnelly et al. | ............. | 707/705 |
| 2010/0268712 A1* | 10/2010 | Ngwije | ......................... | 707/737 |
| 2010/0306175 A1* | 12/2010 | Johnson et al. | .............. | 707/663 |
| 2010/0306176 A1* | 12/2010 | Johnson et al. | .............. | 707/664 |
| 2010/0306180 A1* | 12/2010 | Johnson et al. | .............. | 707/695 |
| 2010/0306283 A1* | 12/2010 | Johnson et al. | .............. | 707/803 |
| 2011/0099154 A1* | 4/2011 | Maydew et al. | ............... | 707/692 |
| 2012/0011101 A1* | 1/2012 | Fang et al. | ..................... | 707/654 |

OTHER PUBLICATIONS

U.S. Appl. No. 12/495,274, filed Jun. 30, 2009, Janakiraman, V.

(Continued)

*Primary Examiner* — Christopher J Raab
(74) *Attorney, Agent, or Firm* — Campbell Stephenson LLP (57) ABSTRACT

A system and method for creating an inverted index is disclosed. The inverted index is created from indexing information received by a deduplication server. This indexing information is collected by a deduplication client during a backup operation and includes a list of keywords and a plurality of values. Once the indexing information is received, the index is constructed and includes a list of keywords. Each of the keywords is mapped to a value, each value represents a section of a document, and each section of the document includes at least a portion of a keyword.

23 Claims, 8 Drawing Sheets

(56) References Cited

OTHER PUBLICATIONS http://www.commvault.com/products-search.html#t-1 , retrieved from internet Aug. 29, 2011, pp. 2.
http://documentation.commvault.com/dell/release_6_1_0/qinetix_books_online//english_us/features/content_indexing/content_indexing.htm, retrieved from internet Aug. 29, 2011, pp. 4.
IBM InfoSphere Content Collector, Version 2.1.1., "Enabling item types for processing by the indexer for text search," Available at http://publib.boulder.ibm.com/infocenter/email/v2r1m1/index.jsp?topic=/com.ibm.content.collector.doc/text-indexer/t_afu_creating_item_type.htm. Retrieved Aug. 12, 2013, pp. 1-2.

* cited by examiner

INVERTED INDEX FOR TEXT SEARCHING WITHIN DEDUPLICATION BACKUP SYSTEM

FIELD OF THE INVENTION

This invention relates to inverted indexes, and more particularly, to creating and maintaining inverted indexes for text searching within a deduplication backup system.

DESCRIPTION OF THE RELATED ART

Backup systems can be implemented to provide backup services for one or more client systems. This has led to an interest in providing content indexing and searching capabilities for backup systems. However, providing backup services for one or more client systems can often lead to backing up duplicate copies of data that can exist within one or more client systems.

Backing up duplicate copies of data translates into additional computer resources needed for creating content indexes and performing a search operation on backup data. Thus, it is desirable to enable efficient content indexing and searching capabilities within a backup system that removes duplicate copies of data.

SUMMARY OF THE INVENTION

Various systems and methods for creating, maintaining, and using an inverted index are disclosed. For example, one method involves receiving indexing information. Indexing information is collected by a deduplication client during a backup operation and received at a deduplication server. In addition, indexing information includes a list of keywords and a plurality of values. Once the indexing information is received, an index is constructed. This index includes a list of keywords, where each keyword maps to a value, each value represents a section of a document, and each section of a document includes at least a portion of a keyword.

In one embodiment, a section of a document is a data segment and a value is a fingerprint calculated from the data of the data segment. In addition, the index is configured to index non-duplicate copies of such data segments.

The method may also involve performing a keyword search using the index, in response to a keyword search request identifying at least one keyword. A list of fingerprints is obtained for fingerprints mapped to the at least one keyword. The method then involves returning a list of data segments represented by each fingerprint from the list of fingerprints.

In one embodiment, the method involves determining whether each fingerprint from the list of fingerprints exists at a deduplication server. If any of the fingerprints from the list of fingerprints do not exist at the deduplication server, the non-existent fingerprints are removed from the list of fingerprints. In one embodiment, the method involves updating the index by removing the non-existent fingerprints from the index, in response to removing the non-existent fingerprints from the list of fingerprints.

In another embodiment, the method involves retrieving a first document corresponding to a data segment selected from the list of data segments.

In yet another embodiment, the method involves updating a central index database stored at a deduplication server. The central index database is updated by sorting the index and merging the indexing information with previous indexing information at the central index database.

An example of a system can include one or more processors and memory coupled to the processors. The memory stores program instructions executable to perform a method like the one described above. Similarly, such program instructions can be stored upon a computer readable storage medium.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents, and alternatives falling within the spirit and scope of the invention defined by the appended claims.

DETAILED DESCRIPTION

An inverted index is a data structure that stores information regarding the location of keywords within a document or set of documents. In particular, an inverted index maps keywords to locations within one or more documents to allow for quick text searching.

To support content searching within a backup system, an inverted index can be employed to search for keywords within one or more documents. An inverted index is generally created within a client system. When documents are parsed at the client system, keywords within such documents are added to the inverted index. Thereafter, a search engine can employ the inverted index during a text search operation to produce a list of matching documents.

However, this approach can lead to inefficient searching due to the possibility of large inverted indexes and slow response times. A large inverted index can be a result of indexing the same keywords multiple times (e.g., due to having duplicate copies of documents and/or data segments). Creating and maintaining a large inverted index, particularly one with duplicate indexing information, translates into additional computer resources and disk space. In addition, search response times are increased if the results of a search include duplicate copies of documents or segments thereof to be restored. Restoring duplicate copies of documents or segments thereof also translates into additional computer resources and network bandwidth.

Therefore, it is desirable to create and maintain an inverted index within a backup system that removes duplicate copies of data (e.g., a system referred to as a deduplication backup system) in order to conserve storage space and computer resources. It is also desirable that the deduplication backup system allow for quick text searches and a mechanism by which to update an inverted index.

Figure 1:
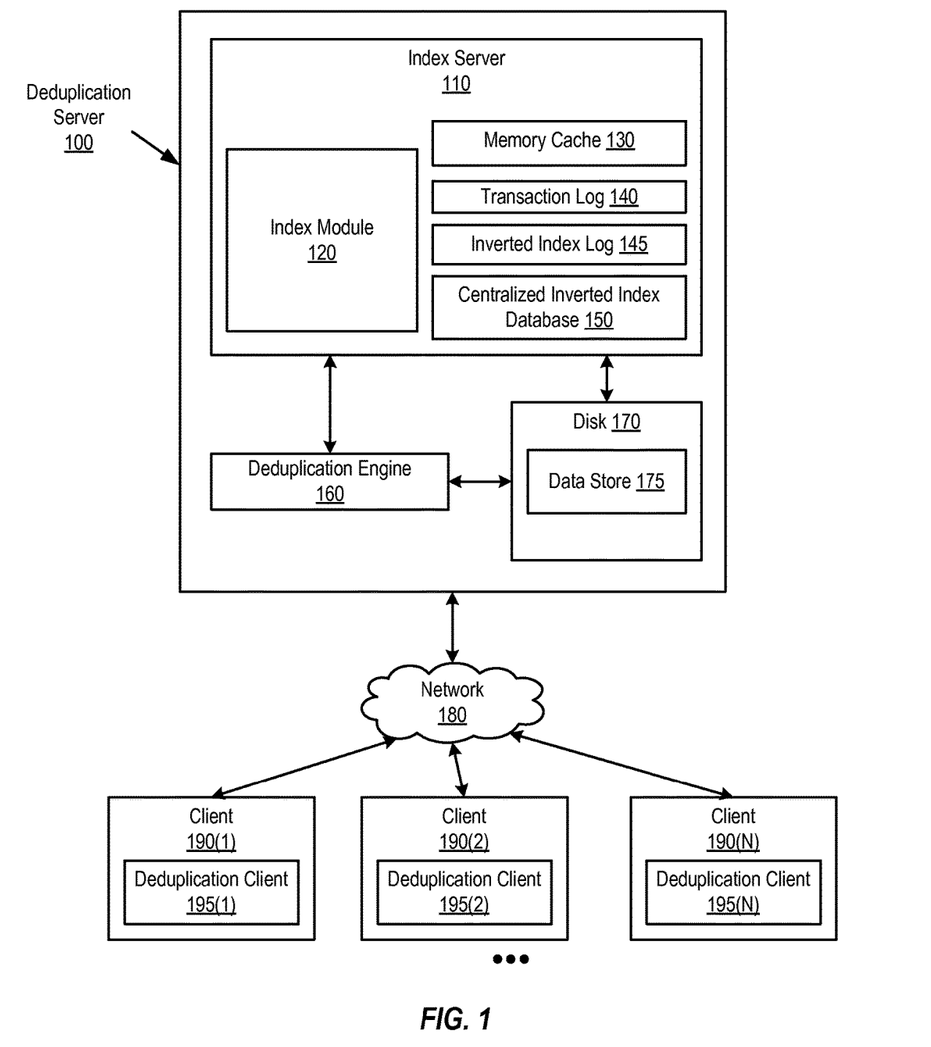
FIG. 1 is a block diagram showing a system for creating and maintaining an inverted index, according to one embodiment of the present invention.

FIG. 1 is a block diagram illustrating a system for creating and maintaining an inverted index within a deduplication backup system. As shown, FIG. 1 includes a deduplication server 100, which in turn includes an index server 110 (which further includes an index module 120, a memory cache 130, a transaction log 140, an inverted index log 145, and a centralized inverted index database 150), a deduplication engine 160, and disk 170 (which further includes a data store 175).

A network 180 facilitates communication or data transfers occurring between deduplication server 100 and clients 190. Clients 190, illustrated as client 190(1), client 190(2) . . . client 190(N) further include deduplication clients 195, illustrated as deduplication client 195(1), 195(2) . . . 195(N). Clients 190 produce data to be backed up by deduplication server 100. Clients 190 generally represent any type or form of computing device.

Index server 110 includes index module 120. Index module 120 creates and maintains an inverted index for deduplication server 100 based on indexing information received from deduplication client 195. This inverted index consists of keywords which correspond to locations within a document or set of documents that include such keywords. Once created, this inverted index can be searched for keyword matches, and the corresponding documents that include the searched keywords can be retrieved by determining their location from the inverted index entries.

When creating an inverted index, any number of different indexing formats can be used. For example, indexing information can be described on a keyword-by-keyword basis or on a data segment-by-data segment basis. Whenever indexing information is described on a keyword-by-keyword basis, documents are broken down into sections that are inclusive of single keywords (e.g., one section per keyword). By contrast, whenever indexing information is described on a data segment-by-data segment basis, documents are broken down into data segments with pre-determined boundaries, regardless of whether keywords are included in their totality or in parts (e.g. one data segment may include single keywords and/or parts of other keywords).

Furthermore, in some implementations, an inverted index is created within a client (e.g., client 190) using an original document or sets of documents. However, creating an inverted index within a client 190 can lead to indexing the same keywords within the same documents multiple times, particularly when a duplicate copy of a document or segment thereof exists within one or more of clients 190. Indexing the same keywords multiple times leads to wasted disk space, computer resources, and network bandwidth.

Alternatively, an inverted index can be created within a deduplication backup system, after duplicate documents or segments thereof have been removed by deduplication server 100, thereby ensuring that only unique data is indexed. By removing duplicate documents (or portions thereof (e.g., data segment)), the amount of data indexed is minimized, which results in less disk space, computer resources, and network bandwidth being used.

Index module 120 within index server 110 is the module that creates an inverted index within a deduplication server 100. Index module 120 utilizes indexing information provided by one or more of deduplication clients 195 to create an inverted index. During a backup operation, a deduplication client collects information regarding a document or set of documents to be backed up. This information can include, for example, a breakdown of each document into data segments and corresponding keywords within each data segment. Each data segment identified in this information is represented by a fingerprint value, where the fingerprint value represents a unique value descriptive of the data segment's contents and/or metadata. Thus, the information collected by the deduplication client and forwarded to index module 120 can be utilized as it exists (e.g., with no additional processing needed to break up a document or set of documents into data segments) for use in creating an inverted index.

Index module 120 can also use the indexing information received from one or more of deduplication clients 195 to update and maintain indexing information and/or inverted indexes stored within a deduplication server so as to maintain a centralized inverted index database. For example, a newly created inverted index can be merged into an existing inverted index to update the centralized inverted index database within index server 110. Index module 120 can also perform keyword searches using a centralized inverted index database to provide users with text search results and relevant documents including the searched keyword, as requested.

Memory cache 130 stores fingerprint values corresponding to data segments. In particular, memory cache 130 is used to maintain a record of data segments that are in an active state (e.g., data segments not to be removed or deleted) because such data segments are either part of a current backup process or part of a previously-completed backup process that may be referenced by the current backup process. These data segments are represented by their fingerprints via a reference list that indicates which data segments are in an active state. Memory cache 130 can be used by index module 120 when attempting to update an inverted index or a centralized inverted index database.

Transaction log 140 maintains a list of the transactions performed by deduplication server 100. Inverted index log 145 similarly maintains a list of the inverted indexes that have been created by index module 120. Inverted index log 145 is also usable to create and maintain a centralized inverted index database, such as centralized inverted index database 150, given that maintaining a centralized inverted index database allows for merging inverted indexes created over time. Data store 175, within disk 170, stores the indexing information received from deduplication clients 195 when the indexing information is received. In addition, data store 175 can store an inverted index when the inverted index is created by index module 120 and can also store a fingerprint database for the deduplication server.

Deduplication engine 160 collects indexing information from deduplication clients 195 via network 180. Deduplication engine is used to temporarily store indexing information, as well as other information, to allow such information to be forwarded or requested by index server 110 and/or index module 120 for use at a later time.

The system of FIG. 1 allows for an efficient mechanism by which an inverted index can be created and maintained at the deduplication backup system level. In particular, an inverted index can be created by an index module 120 within deduplication server 100, after data has been removed of duplicates by deduplication server 100, thereby reducing the amount of data that is indexed. In addition, the amount of processing performed to create an inverted index is minimized given that the breakup of documents into data segments and the identification of keywords within each data segment are performed by deduplication clients 195 as part of a typical backup process, thereby reducing the computer processing resources necessitated for such operations. Thus, the creation and maintenance of an inverted index within a deduplication backup system can be achieved with reduced overall disk space, computer resources, and network bandwidth.

Figure 2:
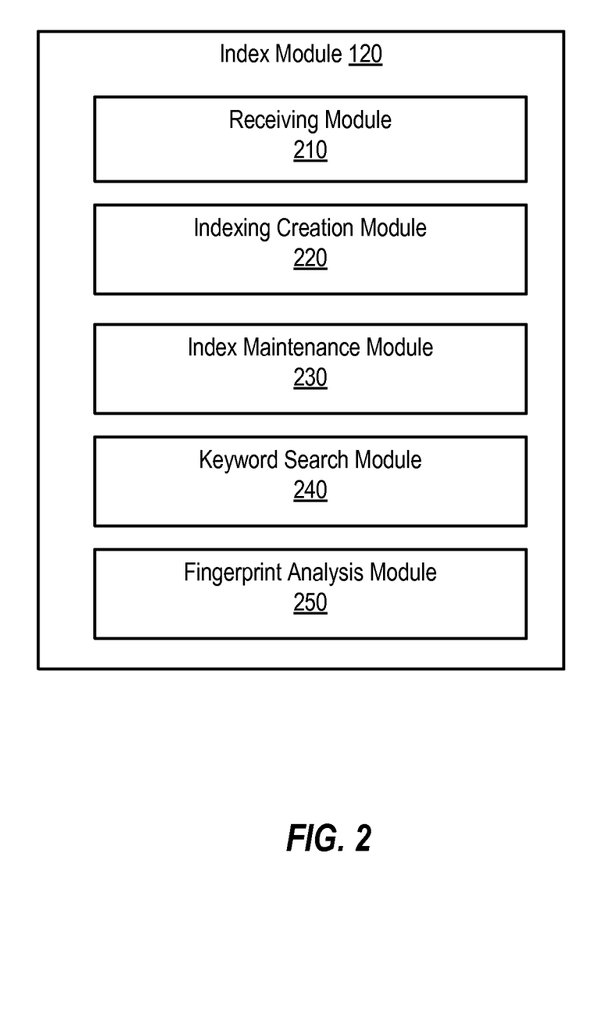
FIG. 2 illustrates an architecture of an index module for creating and maintaining an inverted index, according to one embodiment of the present invention.

FIG. 2 illustrates an architecture of an index module for creating and maintaining an inverted index. Index module 120 includes a receiving module 210, an index creation module 220, an index maintenance module 230, a keyword search module 240, and a fingerprint analysis module 250.

Receiving module 210 receives indexing information from a deduplication client. The indexing information can be forwarded to the receiving module or can be received in response to a request for such information by index module 120. This indexing information is typically collected by a deduplication client during a typical backup process. Once collected, this information is sent to index module 120 for use in creating an inverted index. Indexing information consists of information regarding the breakdown of one or more documents into data segments (represented by fingerprints), as well as information regarding keywords located within each data segment.

Typically, a document is broken down into a number of different data segments, where the boundaries for each data segment are pre-determined, at the time that a backup process is performed, by the size of (e.g., amount of data in) a data segment. These data segments can be described according to their fingerprint values. A fingerprint value is generated according to a calculation based on the contents and/or metadata of the data segment itself. An example of a fingerprint calculation is a hash algorithm.

In an inverted index, a keyword is mapped to a fingerprint value, which corresponds to a data segment in which the keyword is located. With some frequency, the boundaries for a data segment will divide a keyword into two portions in adjacent data segments. In this case, a keyword is mapped to two fingerprint values corresponding to the two adjacent data segments in which the two portions of the keyword can be found. For example, if a first part of a keyword is located in a first data segment and the second part of the keyword is located in a second data segment, an inverted index will list that keyword as having two sets of fingerprint information, one for the first data segment and another for the second data segment. In other cases, a keyword can be the last keyword in a data segment (e.g., not divided into two portions and therefore not crossing the boundary between the current and next data segment). In this case, the keyword is mapped to two fingerprint values corresponding to the current and next data segment.

Index creation module 220 creates an inverted index according to the indexing information received by receiving module 210. The inverted index is created by constructing a data structure that lists keywords within one or more documents. These keywords are then assigned fingerprint values that identify the data segment(s) within such documents containing the keyword (or portion thereof). For example, if a keyword is located within a first data segment of a first document, that keyword is listed in the inverted index with a corresponding fingerprint value representative of the first data segment of the first document.

Index maintenance module 230 maintains an inverted index (e.g., an inverted index, a sorted inverted index database, and/or a centralized inverted index database). An inverted index can be updated or maintained a number of different ways. One way to maintain an inverted index involves updating an inverted index at pre-determined periods of time. This involves checking to see if data segments corresponding to the listed fingerprints in an inverted index still exist after a pre-determined period of time has elapsed. If some of the data segments in an inverted index no longer exist after a certain period of time elapses, those data segments are removed from an inverted index by removing their corresponding fingerprints from the inverted index. By performing this process, an inverted index can be updated.

Another way to maintain an inverted index involves performing a sort and merge operation. Once an inverted index is created, the inverted index is sorted. This sorting takes the contents of an inverted index and orders the keywords according to, for example, some lexicographic order (e.g., alphabetical order). The contents of the sorted inverted index can then be merged with previously stored index information to maintain a centralized inverted index database within a deduplication server.

Still another way to maintain an inverted index involves performing a fingerprint analysis during a keyword search. Whenever a keyword search is performed, the fingerprint listings mapped to the searched keyword(s) are checked to determine if the fingerprints still exist within a fingerprint database. If a data segment corresponding to the searched fingerprint exists, then the fingerprint listings for the searched keyword(s) are maintained in the inverted index. However, if a data segment corresponding to a searched fingerprint does not exist, then the fingerprint listings for the searched keyword(s) are removed from the inverted index.

Keyword search module 240 searches for a keyword or keywords, as requested by a user. A keyword search is performed using an inverted index. The inverted index is searched for the keyword or keywords being requested to obtain a list of corresponding fingerprints. These fingerprints can then be used to retrieve the corresponding data segments for presentation to the user. The document or set of documents including a particular keyword can then be retrieved via pointers based on the data segments selected by the user.

Fingerprint analysis module 250 performs a fingerprint check to determine if a fingerprint exists within a deduplication server. Fingerprint analysis module 250 can search a memory cache of the deduplication server or some other type of fingerprint database stored within the deduplication server to perform this analysis. Furthermore, this analysis can be performed during a keyword search or at periodic intervals of time to update an inverted index.

Figure 3A:
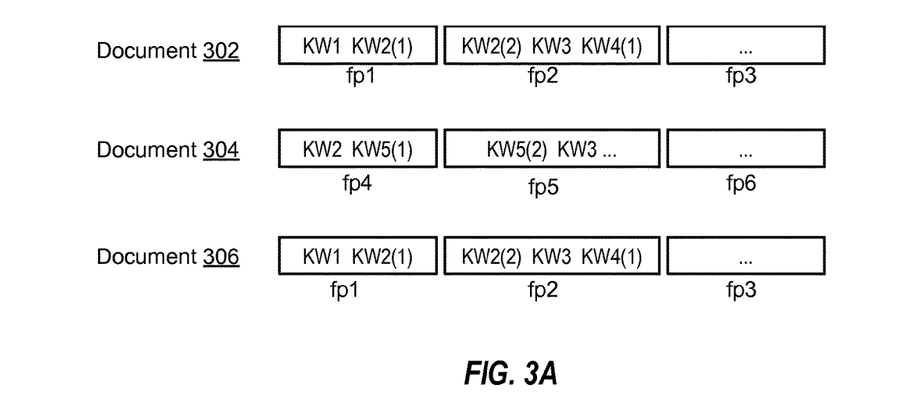
FIG. 3A illustrates an exemplary set of documents used for creating an inverted index, according to one embodiment of the present invention.

FIG. 3A illustrates an exemplary set of documents used in creating an inverted index. Three documents are shown, documents 302, 304, and 306. Each of these documents includes various keywords and is broken down into data segments (e.g., sections of the document with set boundaries). With acceptable certainty, a data segment can typically be represented by its fingerprint value. A fingerprint value is calculated based on a data segment's contents and/or metadata, and so is intended to uniquely distinguish one data segment from other data segments (containing different data).

As shown, document 302 includes three data segments, represented by fingerprint values fp1, fp2, and fp3, respectively. Document 302 includes keywords 1, 2, 3, and 4, (shown as KW1, KW2, KW3, KW4), as well as others. In some cases, the boundaries for a data segment will divide a keyword into two portions, where one portion is located within one data segment and the other portion is located within a second, adjacent data segment. This can occur if a keyword is the last word in a data segment and thus crosses boundaries into the next data segment. For example, KW2 within document 302 is divided between the first and second data segments. Thus, KW2 is shown as being divided into a first part, KW2(1), within the latter part of the first data segment, and a second part, KW2(2), within the first part of the second data segment. The same can be seen for KW4, which is divided between the second and third data segments.

Document 304 also includes three data segments, represented by fingerprint values fp4, fp5, and fp6. Document 304 includes keywords 2, 5, and 3 (illustrated as KW2, KW5, KW3), as well as other such keywords. In this case, KW5 is divided between the first and second data segments of document 304, resulting in a first part, KW5(1), within the latter part of the first data segment, and a second part, KW5(2), within the first part of the second data segment.

Document 306 also includes three data segments, represented by fingerprint values fp1, fp2, and fp3. In this case, the three data segments of document 306 are represented by the same fingerprint values as those of document 302, given that the data contained in the data segments of document 306 is the same as that contained in the data segments of document 302. As such, the data segments of document 306 produce fingerprint values identical to those of document 302 and thus would be considered duplicate copies of data segments and excluded from an inverted index for these documents.

Figure 3B:
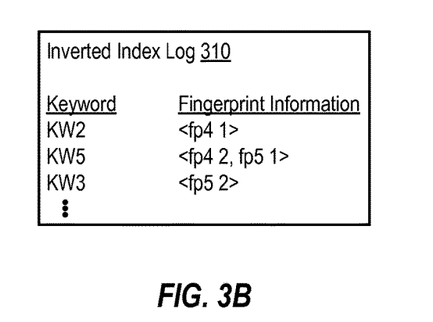
FIG. 3B illustrates an exemplary inverted index, according to one embodiment of the present invention.

FIG. 3B illustrates an exemplary inverted index log created using the indexing information from document 304 of FIG. 3A. Creating an inverted index log involves mapping a keyword to its respective fingerprint location within a document. Thus, inverted index log 310 maps each of the keywords from document 304 to their respective fingerprint locations within document 304.

Inverted index log 310 is created by listing the keywords within document 304 in the order in which the keywords are found within the document. Fingerprint information is added for each of these keywords to describe the location of each of these keywords within one or more documents. For example, keyword KW2 is mapped to fingerprint information <fp4 1>, where the first number of this notation indicates that the keyword is located within a data segment represented by fingerprint fp4 and the second number indicates the keyword is the first keyword within this location.

Keyword KW5 has two sets of fingerprint information, given that keyword KW5 is divided into two adjacent data segments, the first and second data segments of document 304. Thus, keyword KW5 includes fingerprint information <fp4 2, fp5 1> to indicate that the first part of this keyword is in the second part of the data segment represented by the fp4 fingerprint and the second part of this keyword is in the first part of the data segment represented by the fp5 fingerprint.

Keyword KW3 has fingerprint information <fp5 2> to indicate that keyword KW5 is located within the data segment represented by fingerprint fp5, and is the second keyword within this location. In some cases, a keyword is the last keyword in a data segment. In this case, the keyword is mapped to two fingerprint values corresponding to the current and next data segment. For example, if keyword KW3 would have been the last keyword within the data segment represented by fp5 fingerprint, keyword KW3 would have fingerprint information <fp5 2, fp6, 0> to indicate that KW3 was the second keyword within the data segment represented by the fp5 fingerprint and was the last keyword within that data segment. Similar mapping can be performed and added for the remaining keywords within document 304.

Figure 3C:
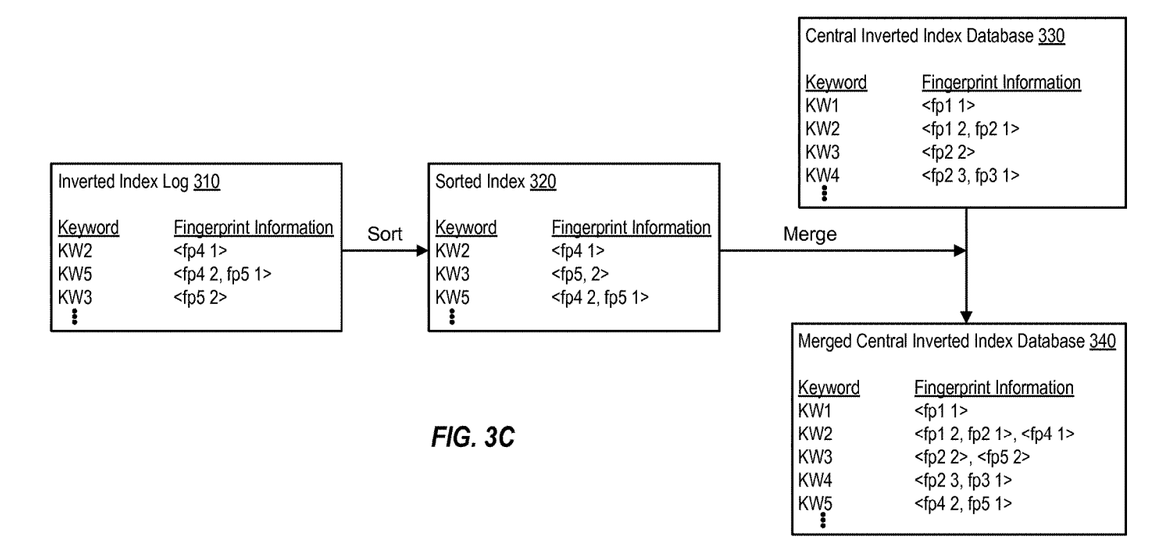
FIG. 3C illustrates exemplary inverted index, sorted index, central inverted index database, and a merged central inverted index database, according to one embodiment of the present invention.

FIG. 3C illustrates an exemplary inverted index log, sorted index, central inverted index database, and a merged central inverted index database. An inverted index log created by a deduplication server can be sorted and merged with a central inverted index database as part of an updating process. This updating process can be performed periodically within the deduplication server to maintain the most recent set of indexing information. Maintaining the most recent set of indexing information within the deduplication server allows for more efficient and accurate text searching by the deduplication server.

Inverted index log 310 can be sorted to create sorted index 320. Sorted index 320 is a sorted list of indexing information based on the indexing information in inverted index log 310. The indexing information of inverted index log 310 is rearranged, for example, in some lexicographic order (e.g., in alphabetic order), to create sorted index 320. Performing this sorting allows for easier merging of the inverted index with an existing centralized inverted index database at a later point. As shown, sorted index 320 takes indexing information for KW2, KW5, KW3, and so on, within inverted index log 310, and rearranges such indexing information into KW2, KW3, KW5, and so on.

A central inverted index database 330 is maintained by the deduplication server to maintain a central inverted index database of the indexing information provided by a deduplication client. As shown, central inverted index database 330 includes keyword information for KW1, KW2, KW3, KW4, and so on, which can be obtained, for example, by indexing information within document 302, as shown in FIG. 3A. By merging sorted index 320 with central inverted index database 330, a merged central inverted index database 340 is created.

Merged central inverted index database 340 includes a listing of all indexing information (e.g., the older inverted index and the most current inverted index). In this case, merged central inverted index database 340 includes fingerprint information for keywords KW1, KW2, KW3, KW4, KW5, and so on, as obtained by indexing documents 302, 304, and 306 from FIG. 3A.

Figure 3D:
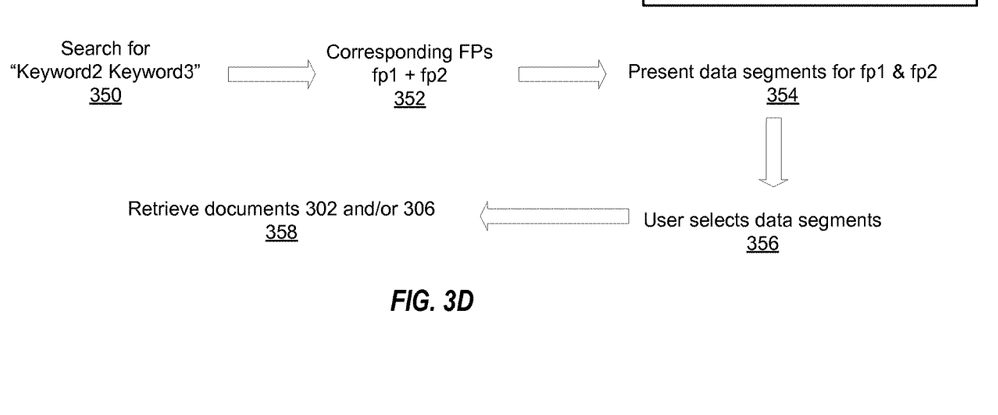
FIG. 3D illustrates an exemplary process for performing a keyword search using an inverted index, according to one embodiment of the present invention.

FIG. 3D illustrates an exemplary process for performing a keyword search using an inverted index. At 350, a keyword search request is submitted for identifying the keyword or set of keywords to be searched. In this case, the keyword search is requested for keywords "keyword2" and "keyword3." At 352, the corresponding fingerprint information is obtained for these keywords using merged central inverted index database 340 of FIG. 3C, which reflects the most recent and centralized indexing information.

Using merged central inverted index database 340 from FIG. 3C, a determination is made that keyword2 corresponds to fingerprint information <fp1 2, fp2 1> and <fp4 1> and keyword3 corresponds to fingerprint information <fp2 2> and <fp5 2>. Given that the search request was for keyword2 being adjacent to keyword3, a determination is made as to which indexing information for keyword2 is in an adjacent location to the indexing information for keyword3. The first set of fingerprint information for keyword2, <fp1 2, fp2 1>, is only adjacent to keyword3 at the <fp2 2> location. The second set of fingerprint information for keyword2, <fp4 1>, does not match up with any fingerprint information for keyword3 in an adjacent manner.

Thus, the resulting corresponding fingerprint information set for the desired search will yield fingerprint information <fp1 2, fp2 1> and <fp2 2>. At 354, the data segments mapping to the corresponding fingerprint information are presented to a user. Given that the keyword set requested resides between fp1 and fp2 of a document, the data segments to be presented to the user are the data segments corresponding to the fp1 and fp2 fingerprints. At 356, the user may select the data segments presented in order to view the document that includes such a keyword set. At 358, the respective documents are retrieved for presentation to the user. In this case, both documents 302 and 306 may be retrieved and presented to the user, given that both documents 302 and 306 include data segments corresponding to fp1 and fp2.

Figure 4A:
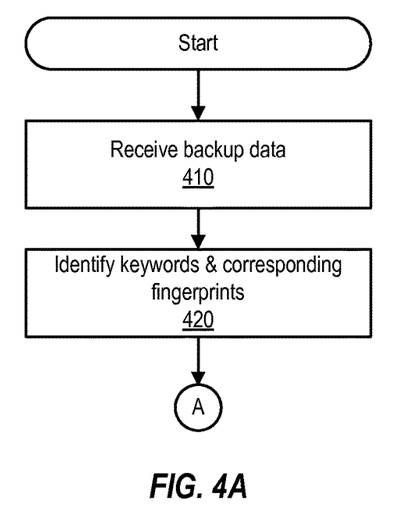
FIG. 4A is a flowchart illustrating an example process for identifying indexing information, as performed by a deduplication client, according to one embodiment of the present invention.

FIG. 4A is a flowchart illustrating an example process for identifying indexing information, as performed by a deduplication client. The process starts at 410 where the deduplication client (such as deduplication clients 195 of FIG. 1) receives backup data from one or more clients (such as clients 190 of FIG. 1). The deduplication client then identifies indexing information using the backup data received from the one or more clients. The indexing information identified by the deduplication client can include a list of keywords found within the one or more documents to be backed up and the corresponding fingerprints that map to data segments in which these keywords are located. The keywords and corresponding fingerprints within the indexing information are identified at 420.

Figure 4B:
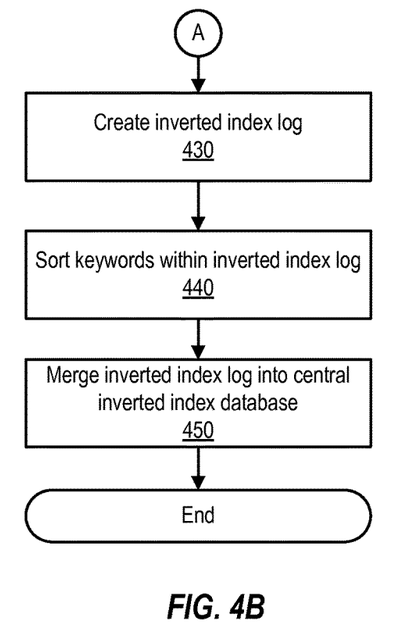
FIG. 4B is a flowchart illustrating an example process for creating and maintaining an inverted index, as performed by a deduplication server, according to one embodiment of the present invention.

The process continues at FIG. 4B which illustrates the process by which a deduplication server creates and maintains an inverted index. At 430, the indexing information is used by the deduplication server to create an inverted index log. The inverted index log is created by listing keywords found within a document or set of documents and mapping those keywords to fingerprint values which identify the data segments in which such keywords can be found.

The inverted index log is then sorted at 440. This sorting can arrange the keywords, for example, in some lexicographic order (e.g., in alphabetical order), in preparation for merging the index information with other indexing information. At 450, the sorted inverted index log can be merged with information maintained at a central inverted index database at 450. Once merged, the process ends. In some embodiments, the sorting and merging of 440 and 450 are not performed at the time in which an inverted index log is created but are instead performed at pre-determined periods of time. In these cases, the process is paused temporarily after the creation of 430 and continues at 440 once a pre-determined period of time elapses.

Figure 5:
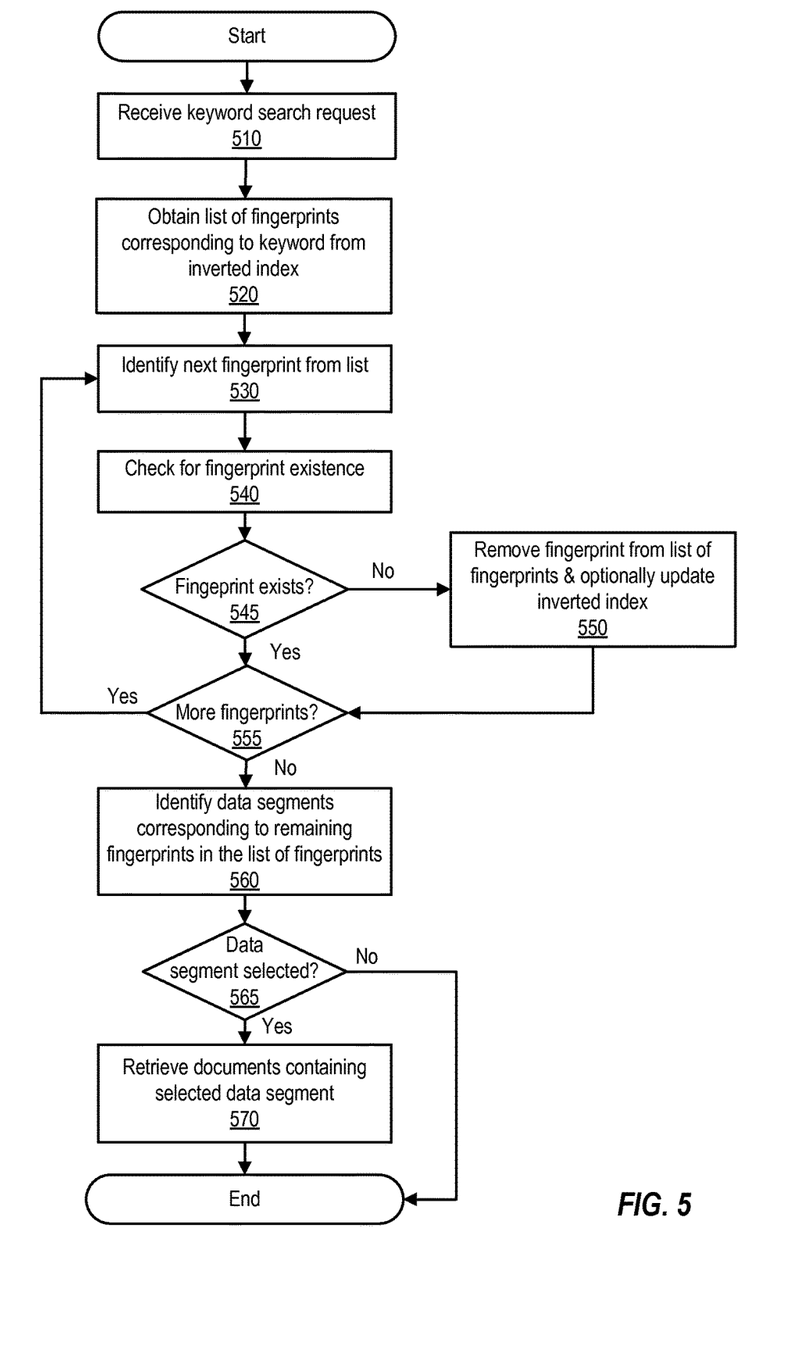
FIG. 5 is a flowchart illustrating an example process for performing a keyword search using an inverted index, according to one embodiment of the present invention.

FIG. 5 is a flowchart illustrating an example process for performing a keyword search using an inverted index. The process begins at 510, where a keyword search request is received. This request identifies a keyword or set of keywords to be searched using an inverted index.

At 520, the deduplication server references its inverted index to determine a list of fingerprints corresponding to the keyword or set of keywords to be searched. This is determined by searching for the desired keywords and identifying the fingerprints corresponding to those keywords within an inverted index.

Once the fingerprint list is retrieved, each fingerprint from the list is examined to determine whether the fingerprint still exists. This determination is made by referencing a cache or other type of fingerprint database maintained by the deduplication server. This fingerprint analysis process begins at 530, where the first or next fingerprint from the list is identified.

At 540, the identified fingerprint is analyzed to determine whether that fingerprint exists at the deduplication server. This determination can be made, for example, by accessing a memory cache maintained by the deduplication server or by accessing a fingerprint database maintained by the deduplication server. A determination is then made at 545 to determine whether a fingerprint still exists. If the fingerprint does not exist in cache, the fingerprint being examined is removed from the list of fingerprints, as shown in 550. In response to removing the fingerprint from the list of fingerprints, an update to the inverted index can also be optionally performed to remove the non-existent fingerprints from the inverted index.

If a fingerprint does exist, the fingerprint is kept in the list of fingerprints obtained at 520. The analysis then continues at 555 to determine if more fingerprints in need of analysis remain within the list of fingerprints. The analysis performed in 530-555 is repeated until all fingerprints from the list of fingerprints have been examined.

Once all fingerprints from the list of fingerprints have been examined, the data segments corresponding to the fingerprints remaining in the list of fingerprints are identified at 560. The identified data segments are portions of a document that are displayable to a user and which include all or a portion of the keywords being searched. At 565, a determination is made as to whether any of the identified data segments have been selected by a user. If no data segments are selected by a user, the process ends. Otherwise, if any of the identified data segments are selected by the user, the documents containing the selected data segments are retrieved in 570 for displaying to the user. This retrieval is performed by referencing a pointer from a data segment to the document. Once the documents in question are retrieved, the process ends.

Figure 6:
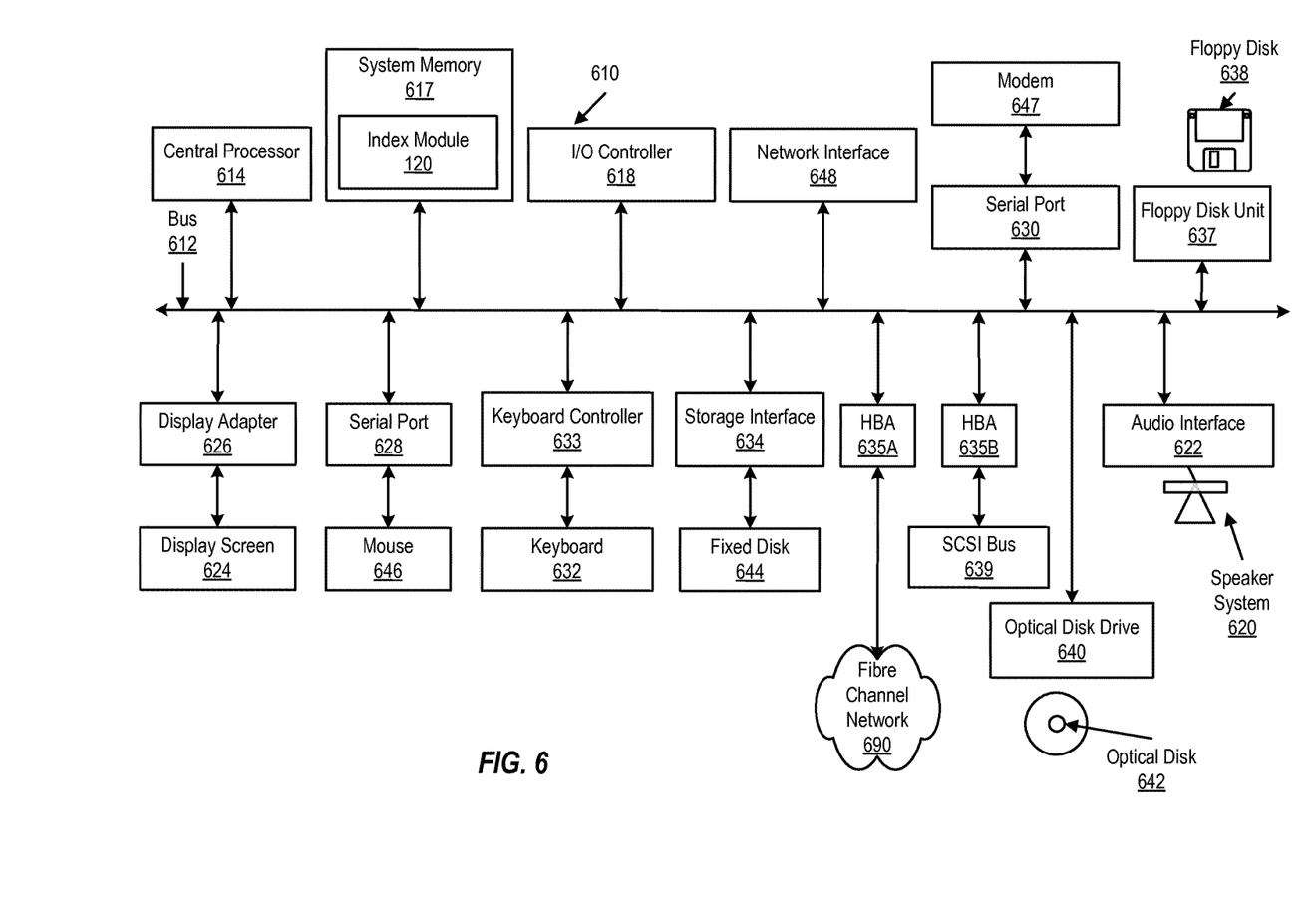
FIG. 6 is a block diagram of a computing system, according to one embodiment of the present invention.

FIG. 6 is a block diagram of a computing system 610 suitable for implementing the creation and maintenance of an inverted index as described above. Computer system 610 includes a bus 612 which interconnects major subsystems of computer system 610, such as a central processor 614, a system memory 617 (typically RAM, but which can also include ROM, flash RAM, or the like, and which can also include software implementing an index module 120 like that shown in FIG. 2), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk unit 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which can include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical disk drive 640), a floppy disk unit 637, or other storage medium. Additionally, applications can be in the form of electronic signals modulated in accordance with the application and data communication technology when accessed via modem 647 or network interface 648.

Storage interface 634, as with the other storage interfaces of computer system 610, can connect to a standard computer-readable medium for storage and/or retrieval of information, such as a fixed disk drive 644. Fixed disk drive 644 can be a part of computer system 610 or can be separate and accessed through other interface systems. Modem 647 can provide a direct connection to a remote server via a telephone link or to the Internet via an internet service provider (ISP). Network interface 648 can provide a direct connection to a remote server via a direct network link to the Internet via a POP (point of presence). Network interface 648 can provide such connection using wireless techniques, including digital cellular telephone connection, Cellular Digital Packet Data (CDPD) connection, digital satellite data connection or the like.

Many other devices or subsystems (not shown) can be connected in a similar manner (e.g., document scanners, digital cameras, and so on). Conversely, all of the devices shown in FIG. 6 need not be present to practice the present invention. The devices and subsystems can be interconnected in different ways from that shown in FIG. 6. The operation of a computer system is readily known in the art and is not discussed in detail in this application. Code to implement the present invention can be stored in computer-readable storage media such as one or more of system memory 617, fixed disk 644, optical disk 642, or floppy disk 638. The operating system provided on computer system 610 can be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention can include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
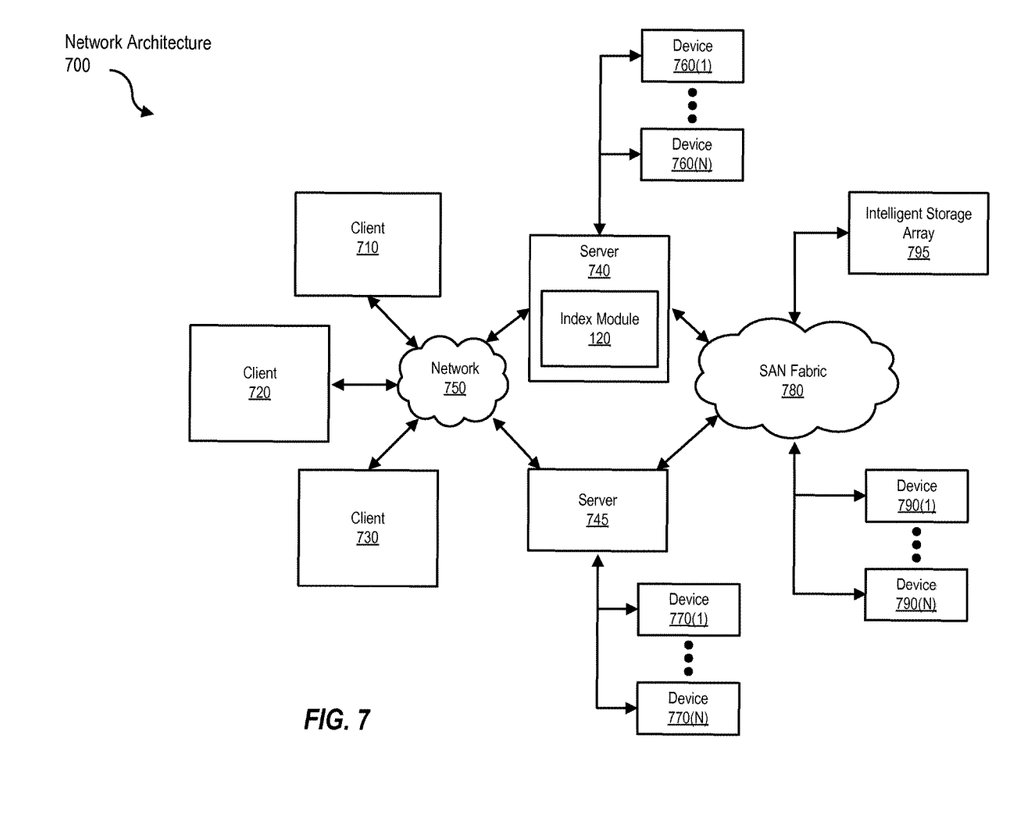
FIG. 7 is a block diagram of a network system, according to one embodiment of the present invention.

FIG. 7 is a block diagram of a network architecture 700 in which client systems 710, 720, and 730 and servers 740 and 745 can be coupled to a network 750. Client systems 710, 720, and 730 generally represent any type or form of computing device or system, such as computing system 610 in FIG. 6.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 can include an index module 120, as shown in FIG. 2.

As illustrated in FIG. 7, one or more storage devices 760(1)-(N) can be directly attached to server 740. Similarly, one or more storage devices 770(1)-(N) can be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) can represent network-attached storage (NAS) devices configured to communicate with servers 740 and 745 using various protocols, such as Network File System (NFS), Server Message Block (SMB), or Common Internet File System (CIFS).

Servers 740 and 745 can also be connected to a storage area network (SAN) fabric 780. SAN fabric 780 generally represents any type or form of computer network or architecture capable of facilitating communication between multiple storage devices. SAN fabric 780 can facilitate communication between servers 740 and 745 and a plurality of storage devices 790(1)-(N) and/or an intelligent storage array 795. SAN fabric 780 can also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to computing system 610 of FIG. 6, a communication interface can be used to provide connectivity between each client system 710, 720, and 730 and network 750. Client systems 710, 720, and 730 can be able to access information on server 740 or 745 using, for example, a web browser or other client software. Such software can allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the embodiments disclosed herein can be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the embodiments disclosed herein can also be encoded as a computer program, stored in server 740, run by server 745, and distributed to client systems 710, 720, and 730 over network 750.

In some examples, all or a portion of the computing devices in FIGS. 1, 2, 3A-3D, 6, and 7 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In addition, one or more of the components described herein can transform data, physical devices, and/or representations of physical devices from one form to another. For example, an index module 120 in FIG. 2 can transform backup data into fingerprints values and keywords and can also transform indexing information into an inverted index.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving indexing information, wherein
the indexing information is received at a deduplication server,
the indexing information is collected by one or more deduplication clients during a backup operation,
the indexing information represents a plurality of documents, which are divided into a plurality of data segments, and a plurality of keywords, and
each of the plurality of data segments is of a predetermined size, and one or more keywords of the plurality of keywords are split between multiple data segments of the plurality of data segments;
constructing an inverted index as part of the backup operation, wherein
the constructing is performed by the deduplication server after deduplication of the plurality of documents and the plurality of data segments,
the inverted index comprises the plurality of keywords,
each keyword of the plurality of keywords maps to at least one fingerprint of a plurality of fingerprints, and
each fingerprint of the plurality of fingerprints represents at least a portion of a data segment of a document of the plurality of documents; and
performing a keyword search using the inverted index, wherein
the keyword search identifies at least one keyword, and
the performing the keyword search comprises obtaining a list of fingerprints that are mapped to the at least one keyword in the inverted index.

2. The method of claim 1, wherein
each fingerprint is calculated based on each of the corresponding data segments, and
the inverted index is configured to index non-duplicate copies of the plurality of data segments.

3. The method of claim 2, further comprising:
returning a list of data segments, wherein
each fingerprint of the list of fingerprints represents at least one data segment within the list of data segments.

4. The method of claim 3, further comprising:
for each fingerprint of the list of fingerprints, determining whether the each fingerprint exists at the deduplication server; and
if any of the each fingerprint of the list of fingerprints do not exist at the deduplication server, removing non-existent fingerprints from the list of fingerprints.

5. The method of claim 4, further comprising:
in response to removing the non-existent fingerprints from the list of fingerprints, updating the index by removing the non-existent fingerprints from the inverted index.

6. The method of claim 3, further comprising:
retrieving a first document corresponding to a selected data segment, in response to selecting the selected data segment from the list of data segments.

7. The method of claim 2, further comprising:
updating a central index database, wherein
the central index database is stored at the deduplication server, and
the updating the central index database comprises
sorting the inverted index, and
merging the indexing information with previous indexing information at the central index database.

8. The method of claim 1, wherein
the one or more deduplication clients perform a breakdown of the plurality of documents into the plurality of data segments and the plurality of keywords within the plurality of data segments.

9. The method of claim 1, further comprising:
maintaining the inverted index, wherein
the maintaining comprises at least one of:
updating the inverted index, or
removing a duplicate copy of a fingerprint that has already been stored in the inverted index before.

10. The method of claim 1, wherein
the list of fingerprints identify one or more data segments of the plurality of data segments that are part of the backup operation or a previously-completed backup operation that is referenced by the backup operation.

11. A non-transitory computer readable storage medium comprising program instructions executable to:
receive indexing information, wherein
the indexing information is received at a deduplication server,
the indexing information is collected by one or more deduplication clients during a backup operation, the indexing information represents a plurality of documents, which are divided into a plurality of data segments, and a plurality of keywords, and each of the plurality of data segments is of a predetermined size, and one or more keywords of the plurality of keywords are split between multiple data segments of the plurality of data segments;

construct an inverted index as part of the backup operation, wherein the constructing is performed by the deduplication server after deduplication of the plurality of documents and the plurality of data segments, the inverted index comprises the plurality of keywords, each keyword of the plurality of keywords maps to at least one fingerprint of a plurality of fingerprints, and each fingerprint of the plurality of fingerprints represents at least a portion of a data segment of a document of the plurality of documents; and perform a keyword search using the inverted index, wherein the keyword search identifies at least one keyword, and the performing the keyword search comprises obtaining a list of fingerprints that are mapped to the at least one keyword in the inverted index.

12. The non-transitory computer readable storage medium of claim 11, wherein each fingerprint is calculated based on each of the corresponding data segments, and the index is configured to index non-duplicate copies of the plurality of data segments.

13. The non-transitory computer readable storage medium of claim 12, wherein the program instructions are further executable to:

return a list of data segments, wherein each fingerprint of the list of fingerprints represents at least one data segment within the list of data segments.

14. The non-transitory computer readable storage medium of claim 13, wherein the program instructions are further executable to:

determine whether each fingerprint of the list of fingerprints exists at the deduplication server; and remove non-existent fingerprints from the list of fingerprints, if any of the each fingerprint of the list of fingerprints do not exist at the deduplication server.

15. The non-transitory computer readable storage medium of claim 14, wherein the program instructions are further executable to:

update the inverted index by removing the non-existent fingerprints from the index, in response to removing the non-existent fingerprints from the list of fingerprints.

16. The non-transitory computer readable storage medium of claim 13, wherein the program instructions are further executable to:

retrieve a first document corresponding to a selected data segment, in response to selecting the selected data segment from the list of data segments.

17. The non-transitory computer readable storage medium of claim 12, wherein the program instructions are further executable to:

update a central index database, wherein the central index database is stored at the deduplication server, and the update of the central index database comprises sorting the inverted index, and merging the indexing information with previous indexing information at the central index database.

18. A system comprising:

one or more processors; and memory coupled to the one or more processors, wherein the memory stores program instructions executable by the one or more processors to:

receive indexing information, wherein the indexing information is received at a deduplication server, the indexing information is collected by one or more deduplication clients during a backup operation, the indexing information represents a plurality of documents, which are divided into a plurality of data segments, and a plurality of keywords, and each of the plurality of data segments is of a predetermined size, and one or more keywords of the plurality of keywords are split between multiple data segments of the plurality of data segments;

construct an inverted index as part of the backup operation, wherein the constructing is performed by the deduplication server after deduplication of the plurality of documents and the plurality of data segments, the inverted index comprises the plurality of keywords, each keyword of the plurality of keywords maps to at least one fingerprint of a plurality of fingerprints, and each fingerprint of the plurality of fingerprints represents at least a portion of a data segment of a document of the plurality of documents; and perform a keyword search using the inverted index, wherein the keyword search identifies at least one keyword, and the performing the keyword search comprises obtaining a list of fingerprints that are mapped to the at least one keyword in the inverted index.

19. The system of claim 18, wherein each fingerprint is calculated based on each of the corresponding data segments, and the index is configured to index non-duplicate copies of the plurality of data segments.

20. The system of claim 19, wherein the program instructions are further executable to:

return a list of data segments, wherein each fingerprint of the list of fingerprints represents at least one data segment within the list of data segments.

21. The system of claim 20, wherein the program instructions are further executable to:

determine whether each fingerprint of the list of fingerprints exists at the deduplication server, and remove non-existent fingerprints from the list of fingerprints, if any of the each fingerprint of the list of fingerprints do not exist at the deduplication server.

22. The system of claim 21, wherein the program instructions are further executable to:

update the inverted index by removing the non-existent fingerprints from the index, in response to removing the non-existent fingerprints from the list of fingerprints.

23. The system of claim method of claim 20, wherein the program instructions are further executable to:

retrieve a first document corresponding to a selected data segment, in response to selecting the selected data segment from the list of data segments.

* * * * *